United States Patent [19]

Leeds

[11] Patent Number: 6,045,234
[45] Date of Patent: Apr. 4, 2000

[54] FISHING TOOL WITH ILLUMINATED RETRACTABLE PROBE

[75] Inventor: Tim J. Leeds, Clermont, N.J.

[73] Assignee: Francis English, Ocean City, N.J.

[21] Appl. No.: 09/182,550

[22] Filed: Oct. 29, 1998

[51] Int. Cl.[7] .............................. B25B 7/22; A01K 97/18
[52] U.S. Cl. ................... 362/119; 7/106; 7/130; 43/53.5; 43/17.5
[58] Field of Search .................. 362/119, 253, 362/120, 130, 132, 133; 43/53.5, 17.5; 7/106; 140/80, 102, 102.5; 224/667; 30/28

[56] References Cited

U.S. PATENT DOCUMENTS

| | | | |
|---|---|---|---|
| 2,688,816 | 9/1954 | Bondesen | 43/53.5 |
| 3,419,924 | 1/1969 | Archibald | 7/106 |
| 4,590,702 | 5/1986 | Chestnutt | 43/53.5 |
| 5,307,586 | 5/1994 | Palmer | 43/53.5 |

*Primary Examiner*—Jon Henry

[57] ABSTRACT

A fishing tool is provided including a housing and a probe assembly having a plunger retractably mounted on the housing. The plunger has a clip mounted thereon for the purpose of removing hooks.

1 Claim, 2 Drawing Sheets

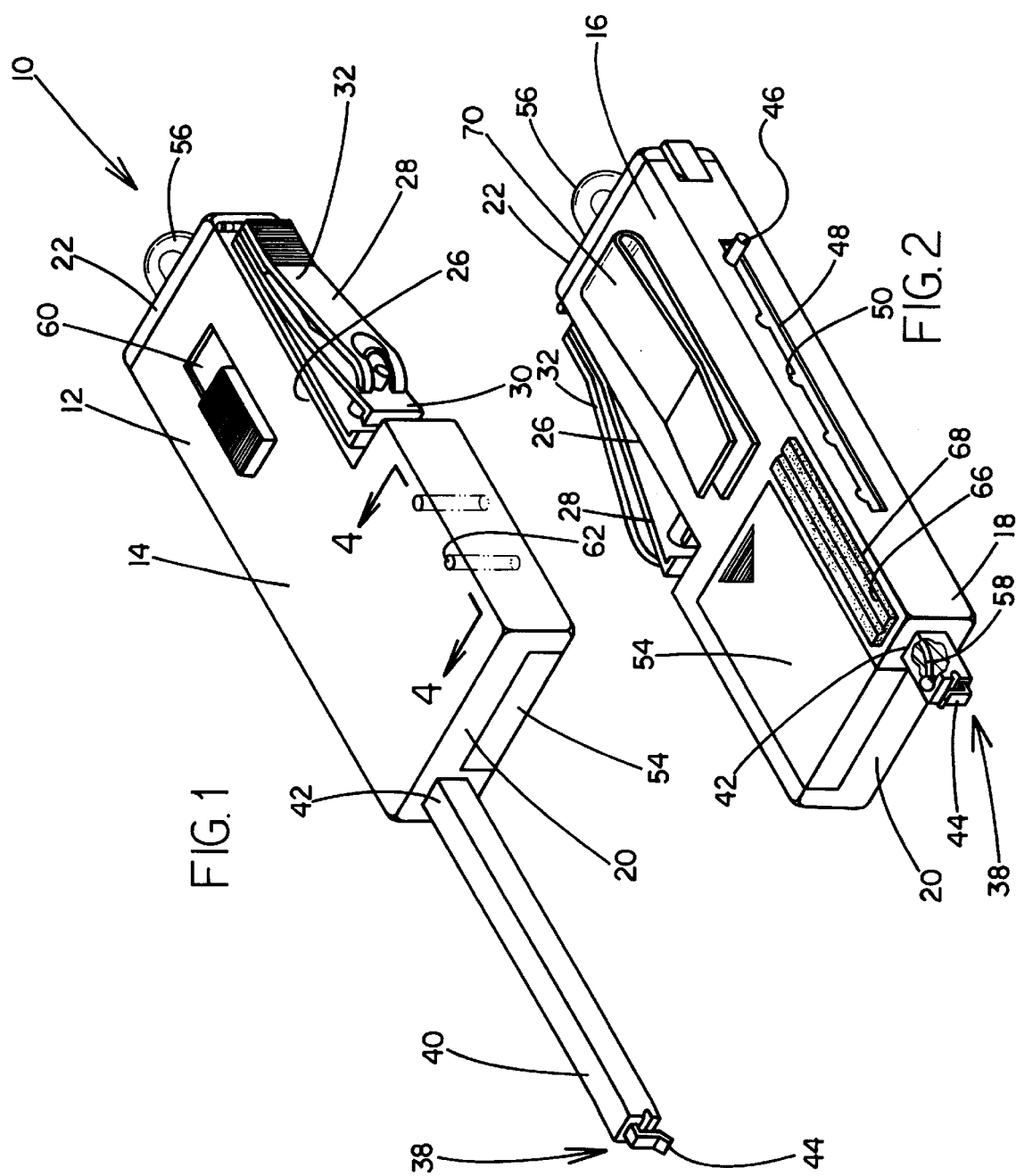

FISHING TOOL WITH ILLUMINATED RETRACTABLE PROBE

BACKGROUND OF THE INVENTION

1. Field of the Invention

The present invention relates to fishing tools and more particularly pertains to a new fishing tool with illuminated retractable probe for providing a comprehensive fishing tool with many uses.

2. Description of the Prior Art

The use of fishing tools is known in the prior art. More specifically, fishing tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,136,744; U.S. Pat. No. 3,825,961; U.S. Pat. No. 5,283,920; U.S. Pat. No. 3,334,437; U.S. Pat. Des. 246,663; and U.S. Pat. No. 3,419,924.

In these respects, the fishing tool with illuminated retractable probe according to the present invention substantially departs from the conventional concepts and designs of the prior art, and in so doing provides an apparatus primarily developed for the purpose of providing a comprehensive fishing tool with many uses.

SUMMARY OF THE INVENTION

In view of the foregoing disadvantages inherent in the known types of fishing tools now present in the prior art, the present invention provides a new fishing tool with illuminated retractable probe construction wherein the same can be utilized for providing a comprehensive fishing tool with many uses.

The general purpose of the present invention, which will be described subsequently in greater detail, is to provide a new fishing tool with illuminated retractable probe apparatus and method which has many of the advantages of the fishing tools mentioned heretofore and many novel features that result in a new fishing tool with illuminated retractable probe which is not anticipated, rendered obvious, suggested, or even implied by any of the prior art fishing tools, either alone or in any combination thereof.

To attain this, the present invention generally comprises a housing having a rectangular configuration. As shown in FIGS. 1 & 2, the housing is defined by a planar rectangular top face, a planar rectangular bottom face and a thin periphery formed therebetween. The periphery is formed of a short front face, a short rear face and a pair of elongated side faces formed therebetween. For reasons that will soon become apparent, a first one of the side faces has a recess formed therein adjacent to and extending through the rear face of the housing. It should be noted that a length of the recess is ½ that of the housing. Next provided is clippers including a pair of planar resilient members each having a perpendicular sharp outboard end and an inboard end pivotally coupled within the recess of the housing adjacent to the rear face. The clippers further includes a control arm pivotally mounted to the outboard ends of the resilient members for selectively abutting the sharp outboard ends. As shown in FIG. 3, the clippers further includes a hook eye line threader. This threader is constructed from a resilient wire bent to form a diamond shape. An end of the diamond shaped wire is pivotally coupled to the inboard ends of the resilient members beneath the control arm. FIGS. 1 & 2 show a probe assembly including a linear plunger having a square cross-section along a length thereof. The plunger extends within a slot formed in the front face of the housing and extends along a second one of the side faces thereof. The probe has an clip mounted to its end having a width ½ that of the probe. As shown in FIGS. 1 & 2, the clip is equipped with a horizontally oriented inboard portion, a vertically oriented intermediate portion, and a beveled outboard portion. The probe assembly further includes a post mounted on the plunger which extends outwardly from and slides along a slit formed in the second side face of the housing. The slit has a plurality of lateral recesses formed therein for biasedly receiving the post to maintain the plunger at discrete lengths within the housing. Also included is a light assembly with a battery compartment accessible via a cover removably mounted to the bottom face of the housing. Mounted to a center of the rear face of the housing is an incandescent lamp which extends therefrom. The incandescent lamp is adapted for illuminating upon the receipt of power. Associated therewith is a fiber optic mechanism including a fiber optic line extending through the plunger and terminated at a lower face of the end of the plunger. The fiber optic line is adapted for directing light therefrom upon the receipt of power. The light assembly further includes a toggle slide switch mounted on the top face of the housing adjacent to the rear face thereof and connected between batteries within the battery compartment and the fiber optic mechanism and the lamp. Such switch serves for selectively supplying the lamp and fiber optic mechanism with power. For bending hooks per the desires of the user, a pair of hook benders are included each defined by a bore formed between the top face and the bottom face of the housing in perpendicular relationship therewith. Ideally, the bores are positioned in close proximity adjacent to the first side face and the font face of the housing. To accommodate hooks of various sizes, each bore has a constant unique circular diameter. FIG. 2 shows a hook sharpener including a thin planar rectangular strip of sharpening stone mounted on the bottom face of the housing. The strip preferably resides along the second side face and adjacent the front face. The strip has an outer surface with a linear recess formed along a length thereof for sharpening hooks when slid along the recess. Finally, a belt clip is provided including a planar rectangular back strip mounted along a central longitudinal axis of the bottom face of the housing. Resiliently mounted to the back strip is a front strip. The front strip has a beveled portion extending outwardly from the front strip. Ideally, the beveled portion has a length about ⅓ that of the back strip.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing tool with illuminated retractable probe apparatus and method which has many of the advantages of the fishing tools mentioned heretofore and many novel features that result in a new fishing tool with illuminated retractable probe which is not anticipated, rendered obvious, suggested, or even implied by any of the prior art fishing tools, either alone or in any combination thereof.

It is another object of the present invention to provide a new fishing tool with illuminated retractable probe which may be easily and efficiently manufactured and marketed.

It is a further object of the present invention to provide a new fishing tool with illuminated retractable probe which is of a durable and reliable construction.

An even further object of the present invention is to provide a new fishing tool with illuminated retractable probe which is susceptible of a low cost of manufacture with regard to both materials and labor, and which accordingly is then susceptible of low prices of sale to the consuming public, thereby making such fishing tool with illuminated retractable probe economically available to the buying public.

Still yet another object of the present invention is to provide a new fishing tool with illuminated retractable probe which provides in the apparatuses and methods of the prior art some of the advantages thereof, while simultaneously overcoming some of the disadvantages normally associated therewith.

Still another object of the present invention is to provide a new fishing tool with illuminated retractable probe for providing a comprehensive fishing tool with many uses.

Even still another object of the present invention is to provide a new fishing tool that includes a housing and a probe assembly having a plunger retractably mounted on the housing. The plunger has a clip mounted thereon for the purpose of removing hooks.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top perspective view of a new fishing tool with illuminated retractable probe according to the present invention.

FIG. 2 is a bottom perspective view of the present invention.

DESCRIPTION OF THE PREFERRED EMBODIMENT

Figure 3:
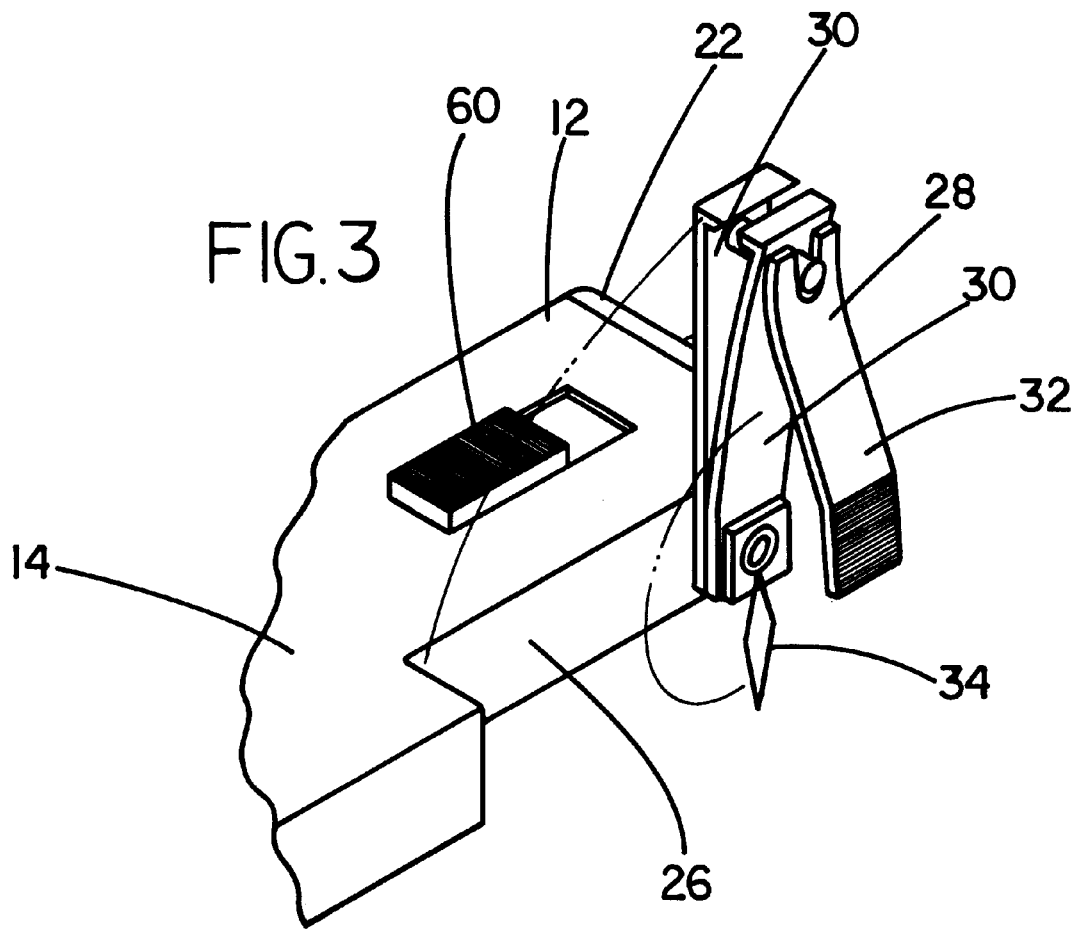
FIG. 3 is a perspective view of the clippers and hook eye line threader of the present invention.
Figure 4:
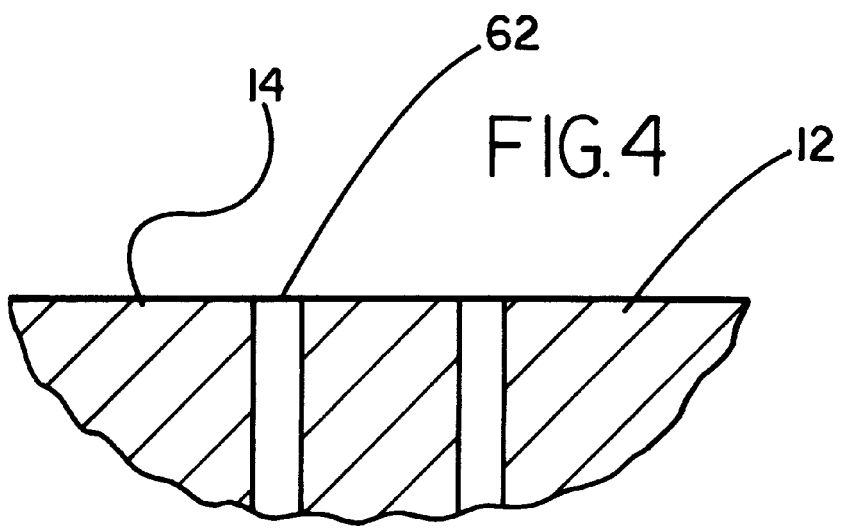
FIG. 4 is a cross-sectional view of the hook bender bores of the present invention.

With reference now to the drawings, and in particular to FIGS. 1 through 4 thereof, a new fishing tool with illuminated retractable probe embodying the principles and concepts of the present invention and generally designated by the reference numeral 10 will be described.

The present invention, designated as numeral 10, includes a steel housing 12 having a rectangular configuration. As shown in FIGS. 1 & 2, the housing is defined by a planar rectangular top face 14, a planar rectangular bottom face 16 and a thin periphery 18 formed therebetween. The periphery is formed of a short front face 20, a short rear face 22 and a pair of elongated side faces 24 formed therebetween. For reasons that will soon become apparent, a first one of the side faces has a recess 26 formed therein adjacent to and extending through the rear face of the housing. It should be noted that a length of the recess is ½ that of the housing.

Next provided is clippers 28 including a pair of planar resilient members 30 each having a perpendicular sharp outboard end and an inboard end pivotally coupled within the recess of the housing adjacent to the rear face. The clippers further includes a control arm 32 pivotally mounted to the outboard ends of the resilient members for selectively abutting the sharp outboard ends.

As shown in FIG. 3, the clippers further includes a hook eye line threader 34. This threader is constructed from a resilient wire bent to form a diamond shape. A tight angled end of the diamond shaped wire is pivotally coupled to the inboard ends of the resilient members beneath the control arm of the clippers. By this structure, the line threader may be selectively pivoted outwardly from the control arm and resilient members of the clippers for use.

FIGS. 1 & 2 show a probe assembly 38 including a linear plunger 40 having a square cross-section along a length thereof. The plunger extends within a slot 42 formed in the front face of the housing along a second one of the side faces thereof. The probe has an clip 44 mounted to its end having a width ½ that of the probe. As shown in FIGS. 1 & 2, the clip is equipped with a horizontally oriented inboard portion with a first length, a vertically oriented intermediate portion in parallel with an end face of the plunger and a second length twice the first length, and a beveled outboard portion with the first length. In the preferred embodiment, a lateral groove is formed in the end face of the plunger of the probe assembly, as shown in FIGS. 1 & 2. In use, a hook lodged within a fish may be positioned between the groove and the clip of the plunger for removal purposes.

The probe assembly further includes a post 46 with a bulbous end mounted on the plunger. The post extends outwardly from the plunger and slides along a slit 48 formed in the second side face of the housing. The slit has a plurality of lateral recesses 50 formed therein for biasedly receiving the post to maintain the plunger at discrete lengths within the housing. Ideally, the post is angled upwardly so that it automatically extends within the recesses when positioned adjacent thereto. As such, the post must angled downwardly manually in order to move the plunger within the slot of the housing.

Also included is a light assembly with a battery compartment accessible via a cover 54 removably mounted to the bottom face of the housing. Mounted to a center of the rear face of the housing is an incandescent lamp 56 which extends therefrom. The incandescent lamp is adapted for illuminating upon the receipt of power. Associated therewith is a fiber optic mechanism including a fiber optic line 58 extending through the plunger and terminated at a lower face of the end of the plunger. The fiber optic line is adapted for directing light therefrom upon the receipt of power. It should be noted that another light is mounted on an inboard end of the fiber optic line within the housing to afford the aforementioned illumination. Such additional light may be accessed via a cover on the rear face of the housing to which the incandescent light is mounted. The cover on the rear face is preferably pivotally coupled with an associated snap coupling. Lastly, it is imperative that a portion of the fiber optic line constitute slack within the housing for accommodating the movement of the plunger.

The light assembly further includes a waterproof toggle slide switch 60 with gasket mounted on the top face of the housing adjacent to the rear face thereof and connected between batteries within the battery compartment and the fiber optic mechanism and the lamp. Such switch serves for selectively supplying the lamp and fiber optic mechanism with power.

For bending hooks per the desires of the user, a pair of hook benders 62 are included each defined by a bore formed between the top face and the bottom face of the housing in perpendicular relationship therewith. Ideally, the bores are positioned in close proximity adjacent to the first side face and the font face of the housing. To accommodate hooks of various sizes, each bore has a constant unique diameter.

FIG. 2 shows a hook sharpener 66 including a thin planar rectangular strip of sharpening stone 68 mounted on the bottom face of the housing. The strip preferably resides along the second side face and adjacent the front face of the housing. The strip has an outer surface with a linear recess formed along a length thereof for sharpening hooks when slid along the recess. In the preferred embodiment, the strip of stone has a length that is less than ½ that of the housing.

Finally, a belt clip 70 is provided including a planar rectangular back strip mounted along a central longitudinal axis of the bottom face of the housing. Resiliently mounted to the back strip is a front strip. The front strip has a beveled portion extending outwardly from the front and back strips. Ideally, beveled portion has a length about ⅓ that of the back strip. It should be understood that the present invention may be constructed in various sizes per the desires of the user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing tool comprising, in combination:

a housing having a rectangular configuration with a planar rectangular top face, a planar rectangular bottom face and a thin periphery formed therebetween defined by a short front face, a short rear face and a pair of elongated side faces formed therebetween, a first one of the side faces having a recess formed therein adjacent to and extending through the rear face of the housing, wherein a length of the recess is ½ that of the housing;

clippers including a pair of planar resilient members each having a perpendicular sharp outboard end and an inboard end pivotally coupled within the recess of the housing adjacent to the rear face, the clippers further including a control arm pivotally mounted to the outboard ends of the resilient members for selectively abutting the sharp outboard ends, the clippers further including a hook eye line threader constructed from a resilient wire bent to form a diamond shape an end of which is pivotally coupled to the inboard ends of the resilient members beneath the control arm;

a probe assembly including a linear plunger having a square cross-section along a length thereof and extending within a slot formed in the front face and extending along a second one of the side faces of the housing, the probe having an clip mounted to an end thereof with ahorizontally oriented inboard portion, a vertically oriented intermediate portion, and a beveled outboard portion each having a width ½ that of the probe, the probe assembly further including a post mounted on the plunger which extends outwardly from and slides along a slit formed in the second side face of the housing, wherein the slit has a plurality of lateral recesses formed therein for biasedly receiving the post to maintain the plunger at discrete lengths within the housing;

a light assembly including a battery compartment accessible via a cover removably mounted to the bottom face of the housing, an incandescent lamp mounted to a center of the rear face of the housing and extending therefrom for illuminating upon the receipt of power, a fiber optic mechanism including a fiber optic line extending through the plunger and terminated at a lower face of the end of the plunger for directing light therefrom upon the receipt of power, and a toggle slide switch mounted on the top face of the housing adjacent to the rear face thereof and connected between batteries within the battery compartment and the fiber optic mechanism and the lamp for selectively supplying the lamp and fiber optic mechanism with power;

a pair of hook benders each including a bore formed between the top face and the bottom face of the housing in perpendicular relationship therewith adjacent to the first side face and the font face of the housing, each bore having a constant unique circular diameter;

a hook sharpener including a thin planar rectangular strip of sharpening stone mounted on the bottom face of the housing along the second side face and adjacent the front face, the strip having an outer surface with a linear recess formed along a length thereof for sharpening hooks when slid along the recess; and a belt clip including a planar rectangular back strip mounted along a central longitudinal axis of the bottom face of the housing and a front strip resiliently mounted to the back strip, wherein the front strip has a beveled portion extending outwardly from the front strip and having a length about ⅓ that of the back strip.

* * * * *